(12) United States Patent
Liu et al.

(10) Patent No.: US 9,584,207 B2
(45) Date of Patent: Feb. 28, 2017

(54) METHODS FOR ADAPTIVE MULTI-ANTENNA SELECTION

(71) Applicant: ACCTON TECHNOLOGY CORPORATION, Hsinchu (TW)

(72) Inventors: I-Ru Liu, Taipei (TW); Ji-Shang Yu, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 83 days.

(21) Appl. No.: 14/676,094

(22) Filed: Apr. 1, 2015

(65) Prior Publication Data
US 2015/0289247 A1    Oct. 8, 2015

(30) Foreign Application Priority Data

Apr. 2, 2014  (TW) .............................. 103112270 A

(51) Int. Cl.
| | | |
|---|---|---|
| G01R 13/08 | (2006.01) |
| G06F 11/00 | (2006.01) |
| H04B 7/06 | (2006.01) |
| H04B 7/04 | (2006.01) |
| H04B 7/08 | (2006.01) |
| H04W 84/12 | (2009.01) |

(52) U.S. Cl.
CPC .......... *H04B 7/0632* (2013.01); *H04B 7/0413* (2013.01); *H04B 7/0602* (2013.01); *H04B 7/0802* (2013.01); *H04W 84/12* (2013.01)

(58) Field of Classification Search
CPC ... H04B 7/0413; H04B 7/0602; H04B 7/0632; H04B 7/0802; H04W 84/12
See application file for complete search history.

(56) References Cited

U.S. PATENT DOCUMENTS

| | | | |
|---|---|---|---|
| 7,526,321 B2 | 4/2009 | Liu | |
| 7,567,213 B2 | 7/2009 | Liu | |
| 2005/0186921 A1* | 8/2005 | Hoo | H04B 7/0814 455/121 |
| 2010/0091891 A1* | 4/2010 | Calando | H04B 7/0805 375/260 |
| 2011/0249760 A1* | 10/2011 | Chrisikos | H01Q 1/243 375/259 |
| 2014/0269964 A1* | 9/2014 | Du | H04B 7/0452 375/267 |

\* cited by examiner

*Primary Examiner* — Maharishi Khirodhar
(74) *Attorney, Agent, or Firm* — Birch, Stewart, Kolasch & Birch, LLP

(57) ABSTRACT

An embodiment of a method for adaptive multi-antenna selection, executed by an AP (access point), which contains at least the following steps. After a data transmission request or a data receipt request is received from a client station, it is determined whether the client station is the first time connected client station within a predetermined time interval. If the client station is the first time connected client station, a first antenna combination is selected to transmit/receive data with the client station using a first antenna selection procedure. If the client station is not the first time connected client station, a second antenna combination is selected to transmit/receive data with the client station using a second antenna selection procedure.

20 Claims, 6 Drawing Sheets

METHODS FOR ADAPTIVE MULTI-ANTENNA SELECTION

CROSS REFERENCE TO RELATED APPLICATIONS

This Application claims priority of Taiwan Patent Application No. 103112270, filed on Apr. 2, 2014, the entirety of which is incorporated by reference herein.

BACKGROUND

Technical Field

The present invention relates to the antenna selection, and in particular to methods for adaptive multi-antenna selection.

Description of the Related Art

In radio field, MIMO (Multiple-Input and Multiple-Output) is an architecture of using multiple antennas at both transmitters and receivers to improve communication performance. It increases significant data throughput and link range without additional bandwidth or increasing transmission power. A typical WLAN (Wireless Local Area Network) AP (Access Point) requires providing services to several subscriber stations in the signal coverage. Because the subscriber stations may be located at different positions, the WLAN AP can be equipped with more antennas than radio transceivers and select proper antenna combinations for each subscriber station to transmit and receive data. Therefore, it is desirable to have methods for selecting proper antenna combinations for particular subscriber stations.

BRIEF SUMMARY

An embodiment of a method for adaptive multi-antenna selection, executed by an AP (access point), which contains at least the following steps. After a data transmission request or a data receipt request is received from a client station, it is determined whether the client station is the first time connected client station within a predetermined time interval. If the client station is the first time connected client station, a first antenna combination is selected to transmit/receive data with the client station using a first antenna selection procedure. If the client station is not the first time connected client station within the predetermined time interval, a second antenna combination is selected to transmit/receive data with the client station using a second antenna selection procedure. The first antenna selection procedure selects the first antenna combination according to single antenna performance, and the second antenna selection procedure selects the second antenna combination according to overall antenna combination performance.

Another embodiment of a method for adaptive multi-antenna selection, executed by an AP, which contains at least the following steps. After a first data transmission request or a first data receipt request is received from a client station, it is determined that the client station is the first time connected client station within a predetermined time interval, the function for responding to the data transmission or receipt request is disabled, forcing the client station to retransmit the first data transmission request or the first data receipt request many times. The retransmitted first data transmission request or the retransmitted first data receipt request is received using a preselected antenna combination to generate a receipt outcome during each receiving process. The performance of each single antenna is obtained according to the receipt outcome, so as to select a first antenna combination. The performance of each single antenna is stored in a memory. After the first antenna combination is selected, the function for responding to the data transmission or receipt request is enabled.

Still another embodiment of a method for adaptive multi-antenna selection, executed by an AP, contains the following steps. After a data transmission request or a data receipt request is received from a client station and it is determined that the client station is not the first time connected client station within a predetermined time interval, information about the performance of each single antenna associated with the client station is read from a memory. Antenna combinations to be measured within a batch are selected according to performance information of each single antenna. A function for responding to the data transmission or receipt request is disabled, forcing the client station to retransmit the data transmission or receipt request many times. The retransmitted data transmission or receipt request is received using one of the antenna combinations to generate a receipt outcome. After the best antenna combination is selected, the function for responding to the data transmission or receipt request is enabled.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
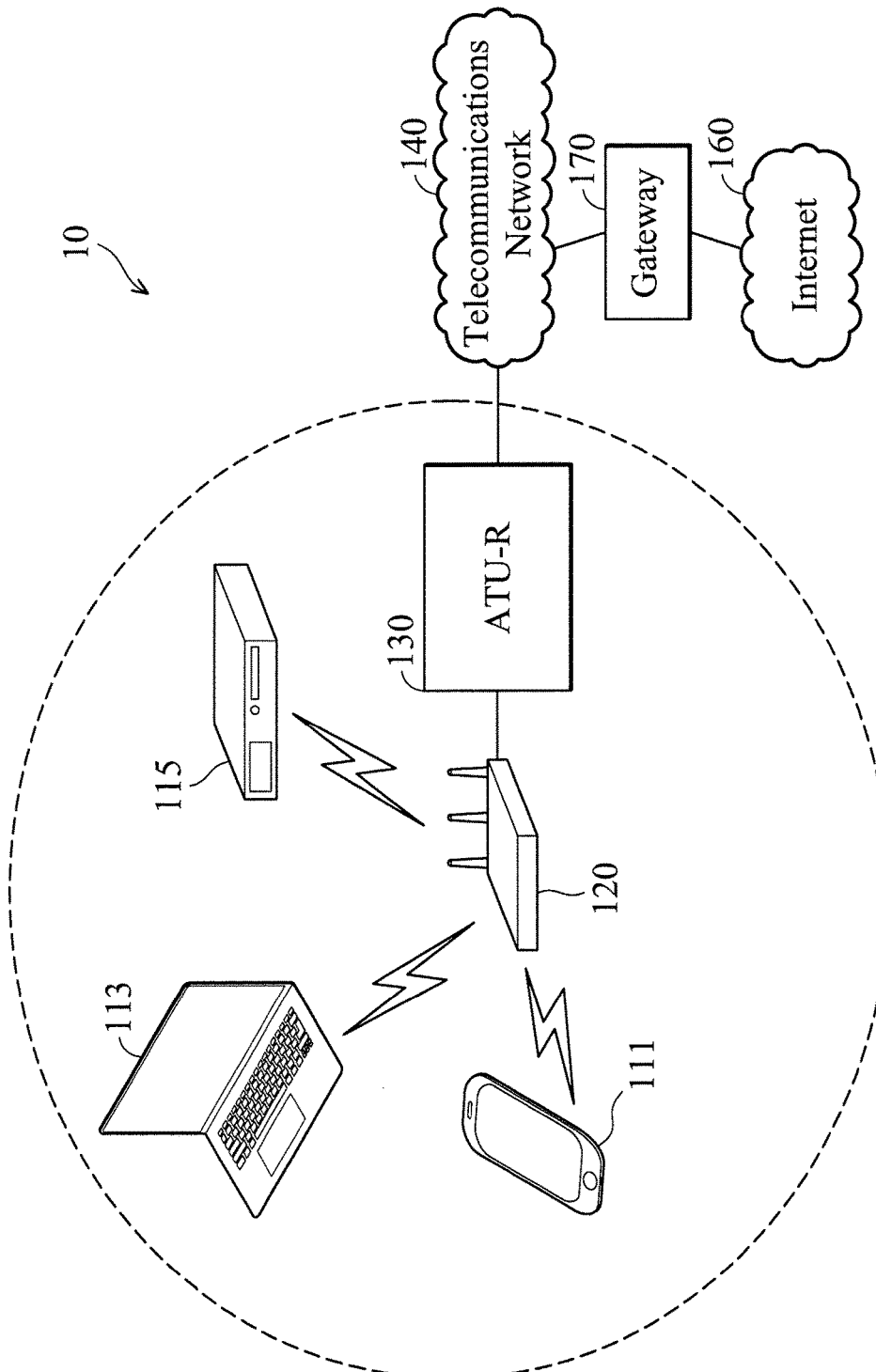
FIG. 1 is the network system architecture according to an embodiment of the invention.

FIG. 1 is the network system architecture according to an embodiment of the invention. The network system 10 contains at least a WLAN AP 120 installed in a public place or home by a telecommunications operator. The WLAN AP 120 connects to the telecommunications network 140 by the ATU-R (ADSL Transceiver Unit Remote) 130. An electronic device discovers the WLAN AP 120 via a built-in Wi-Fi module when moving into signal coverage of the WLAN AP 120, and uses the wireless broadband Internet service provided by the telecommunications operator after completing the registration and authentication mechanism. The electronic device may be a mobile phone 111, a notebook computer 113, a set-top box 115 or another device capable of communicating with the WLAN AP 120. The electronic device requests an AAA (Authentication, Authorization and Accounting) server for connecting to the telecommunications network 140 using the EAP (Extensible Authentication Protocol). After completion of registration and authentication, packets sent from the electronic device can pass through the ATU-R 130, the telecommunications network 140 and the gateway 170 to the Internet 160.

Figure 2:
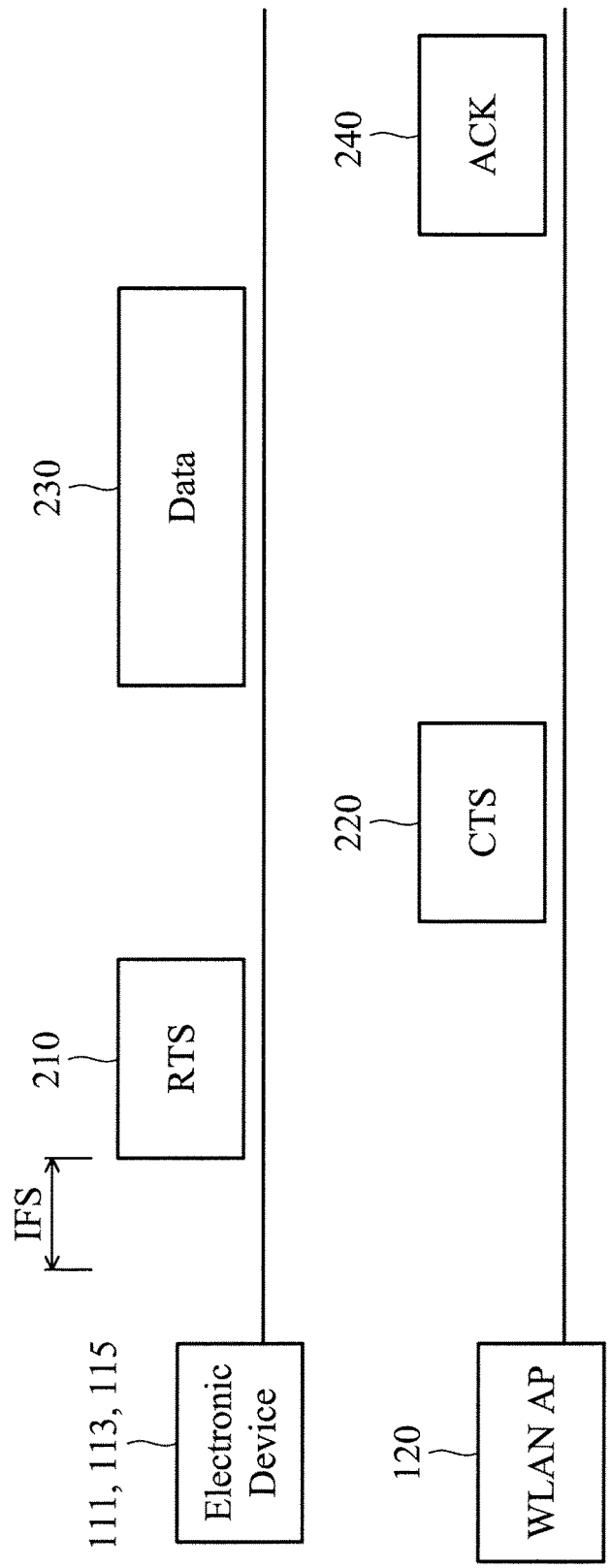
FIG. 2 is a schematic diagram of data transmission according to an embodiment of the invention.

After completing the scan, registration and authentication, the electronic device 111, 113 or 115 can start the data transceiving. FIG. 2 is a schematic diagram of data transmission according to an embodiment of the invention. After waiting for an IFS (Inter-Frame Space), the electronic device 111, 113 or 115 issues a RTS (Request to Send) 210 to notify the WLAN AP 120 with ready to send data, including the data volume to be transmitted. After receiving a CTS (Clear to Send) 220 from the WLAN AP 120, the electronic device 111, 113 or 115 packetizes data 330 into data frames 230 and transmits them to the WLAN AP 120. After successfully receiving data, the WLAN AP 120 replies to the electronic device 111, 113 or 115 with an ACK (acknowledgement) 240. The frames carrying the RTS 210, the CTS 220 and the ACK 240 may be referred to as control frames.

Figure 3:
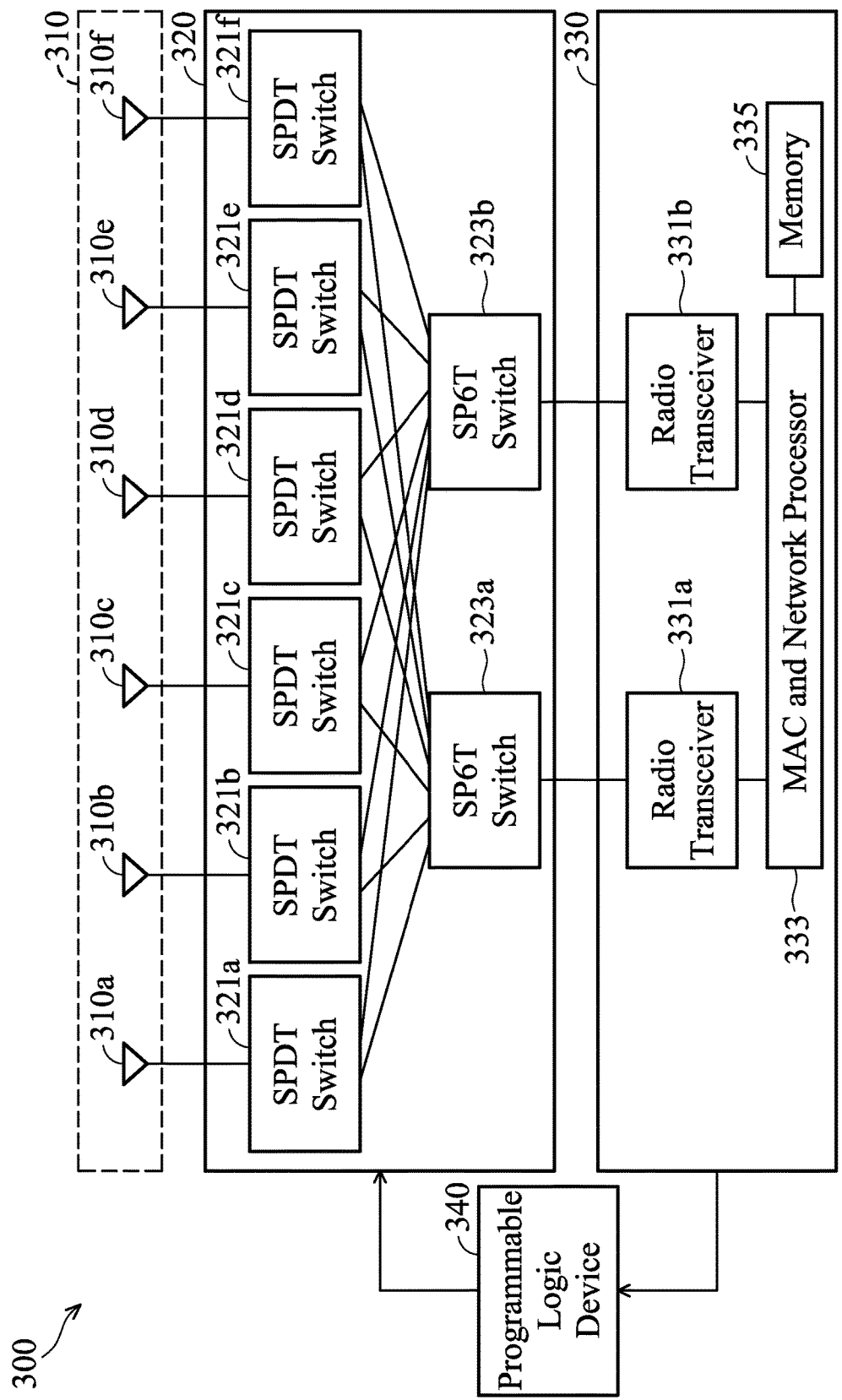
FIG. 3 is a hardware block diagram of the WLAN AP according to an embodiment of the invention.

FIG. 3 is a hardware block diagram of the WLAN AP according to an embodiment of the invention. The hardware block 300 may be practiced in the WLAN AP 120, including an antenna module 310, a switch module 320, a wireless communications chip 330 and a programmable logic device 340. The antenna module 310 contains six antennas 310a to 310f, where each antenna is a directional antenna. The wireless communications chip 330 contains two radio transceivers 331a and 331b, and a MAC (Media Access Control) and network processor 333. The radio transceivers 331a and 331b transmit data via one of the antennas 310a to 310f to the electronic device 111, 113 or 115, and receive data via one of the antennas 310a to 310f from the electronic device 111, 113 or 115 through paths established by the switch module 320. The MAC and network processor 333 can be implemented in numerous ways, such as with dedicated hardware, or with general-purpose hardware (e.g., a single processor, multiple processors or graphics processing units capable of parallel computations, or another example of general-purpose hardware) that is programmed using microcode or software instructions to perform the functions recited herein. The MAC and network processor 333 may save data in the memory 335 for subsequent use, which is generated in any step of the method for adaptive antenna selection to be discussed as follows. The MAC and network processor 333 may issue commands to the programmable logic device 340 to control the switch module 320 to respectively couple the radio transceivers 331a and 331b with two of the antennas 310a to 310f. The MAC and network processor 333 may issue commands to the programmable logic device 340 through a GPIO (General Purpose Input/Output) interface. The programmable logic device 340 may control the switch module 320 through a proprietary control port. The switch module 320 contains six SPDT (Single-Pole Double-Through) switches 321a to 321f and two SP6T (Single-Pole Six-Through) switches 323a to 323b. Each SPDT switch connects to one antenna, and couples the antenna with one of the SP6T switches 323a and 323b controlled by the programmable logic device 340. Each SP6T switch connects to one radio transceiver, and couples the radio transceiver with one of the SPDT switches 321a and 321f controlled by the programmable logic device 340. By the control of the programmable logic device 340, two paths are formed in the switch module 320, thereby enabling the radio transceiver 331a tranceives radio signals via one antenna while the radio transceiver 331b to transmit/receive radio signals via another antenna. For example, the radio transceiver 331a is coupled with the antenna 310a and the radio transceiver 331b is coupled with the antenna 310b.

It should be noted that those skilled in the art may modify the architecture of FIG. 3 to include more or fewer antennas, and for adapting the modification to the quantity of antennas, replace the SP6T switches 323a and 323b with adequate switches. For example, since the antenna module 310 contains eight antennas, each radio transceiver may connect to a SP8T (Single-Pole Eight-Through) switch. In addition, those skilled in the art may modify the chip 330 to include more radio transceivers, and for adapting the modification to the quantity of radio transceivers, replace the SPDT switches 321a and 321f with adequate switches. For example, since the chip 330 contains three radio transceivers, each antenna may connect to a SP3T (Single-Pole Three-Through) switch.

It could be observed from FIG. 3 that the quantity of antennas is greater than the quantity of radio transceivers. Since the electronic device 111, 113 or 115 may move to any position in the signal coverage, fifteen different antenna combinations may be tried if an attempt is made to select the best two from six directional antennas for two radio transceivers to receive and transmit radio signals from and to the electronic device. The electronic device 111, 113 or 115, or others capable of communicating with the WLAN AP 120, may be collectively referred to as client stations. If the quantity of directional antennas is increased to eight and the quantity of radio transceivers is increased to three, the total number of antenna combinations that need to be tried is increased to fifty-six. Table 1 shows the total number of combinations that need to be tried for different quantities of antennas and radio transceivers, where m indicates the quantity of antennas and n indicates the quantity of radio transceivers.

TABLE 1

| Quantity of Radio Transceivers | Quantity of Antennas | Total number of antenna combinations [C(m, n)] |
| --- | --- | --- |
| 2 | 3 | 3 |
| 2 | 4 | 6 |
| 2 | 5 | 10 |
| 2 | 6 | 15 |
| 2 | 7 | 21 |
| 2 | 8 | 28 |
| 3 | 4 | 4 |
| 3 | 5 | 10 |
| 3 | 6 | 20 |
| 3 | 7 | 35 |
| 3 | 8 | 56 |
| 4 | 5 | 5 |
| 4 | 6 | 15 |
| 4 | 7 | 35 |
| 4 | 8 | 70 |

Figure 4A:
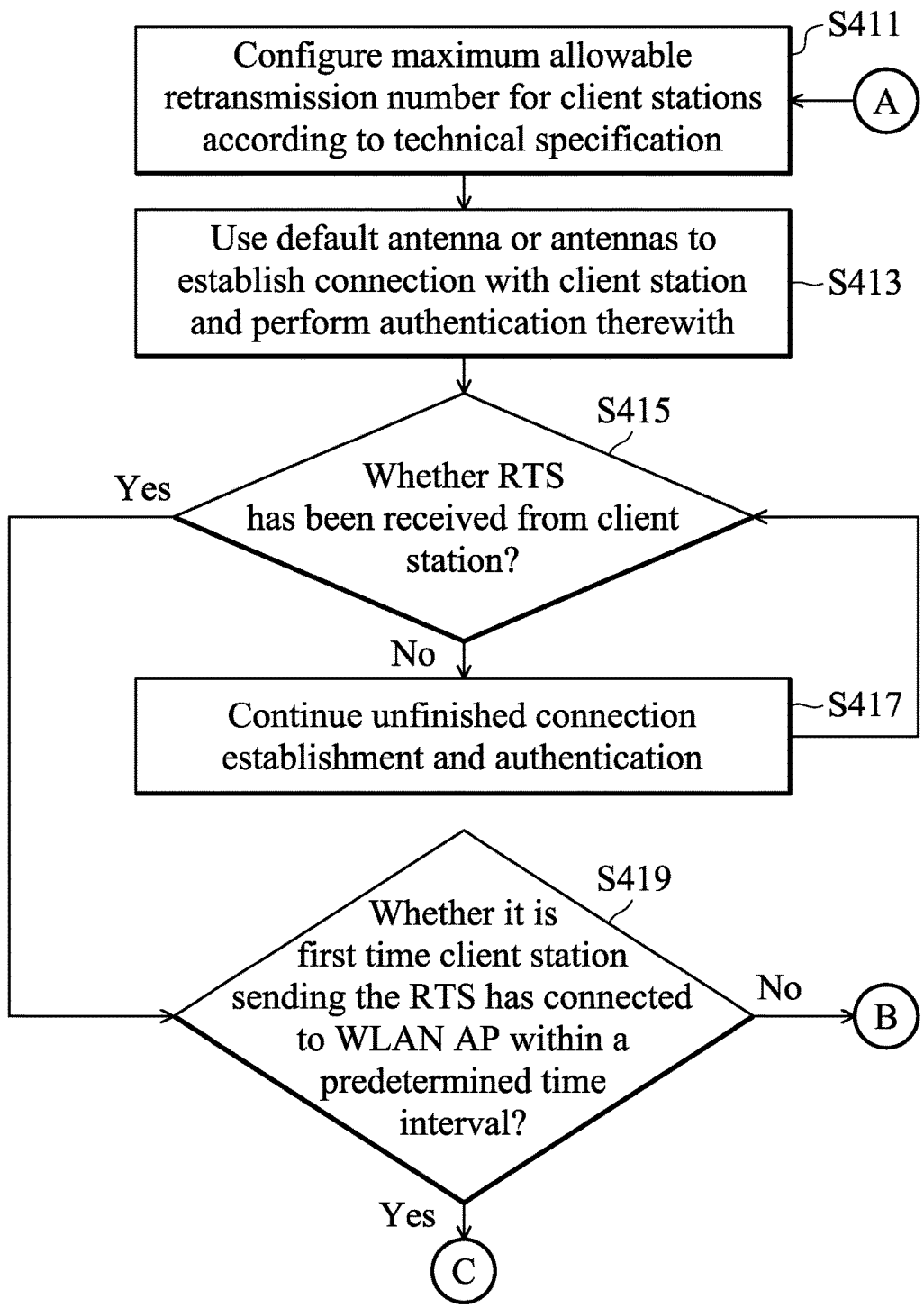
FIGS. 4A, 4B and 4C illustrate flowcharts of a method for adaptive multi-antenna selection according to an embodiment of the invention.
Figure 4B:
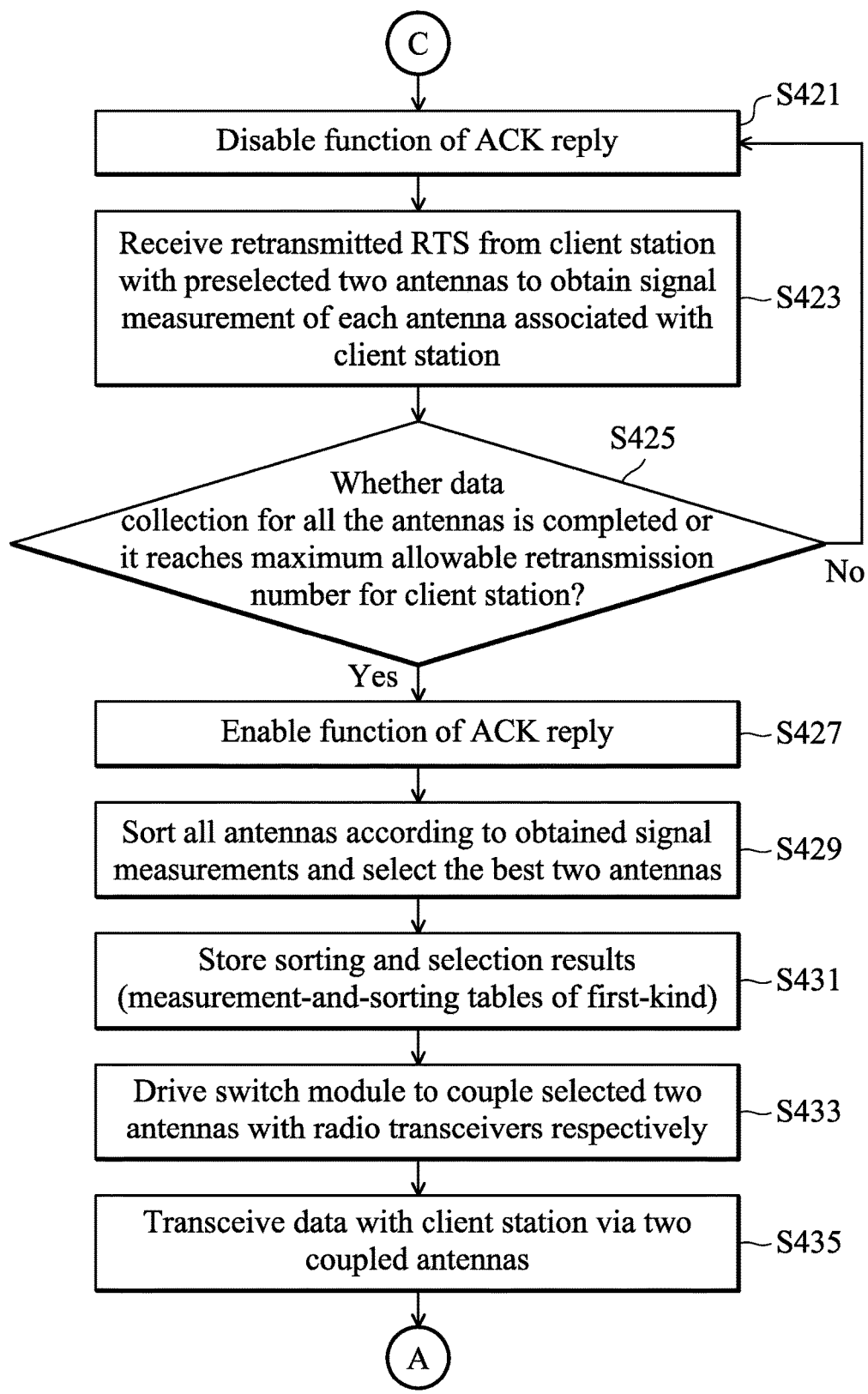
Figure 4C:
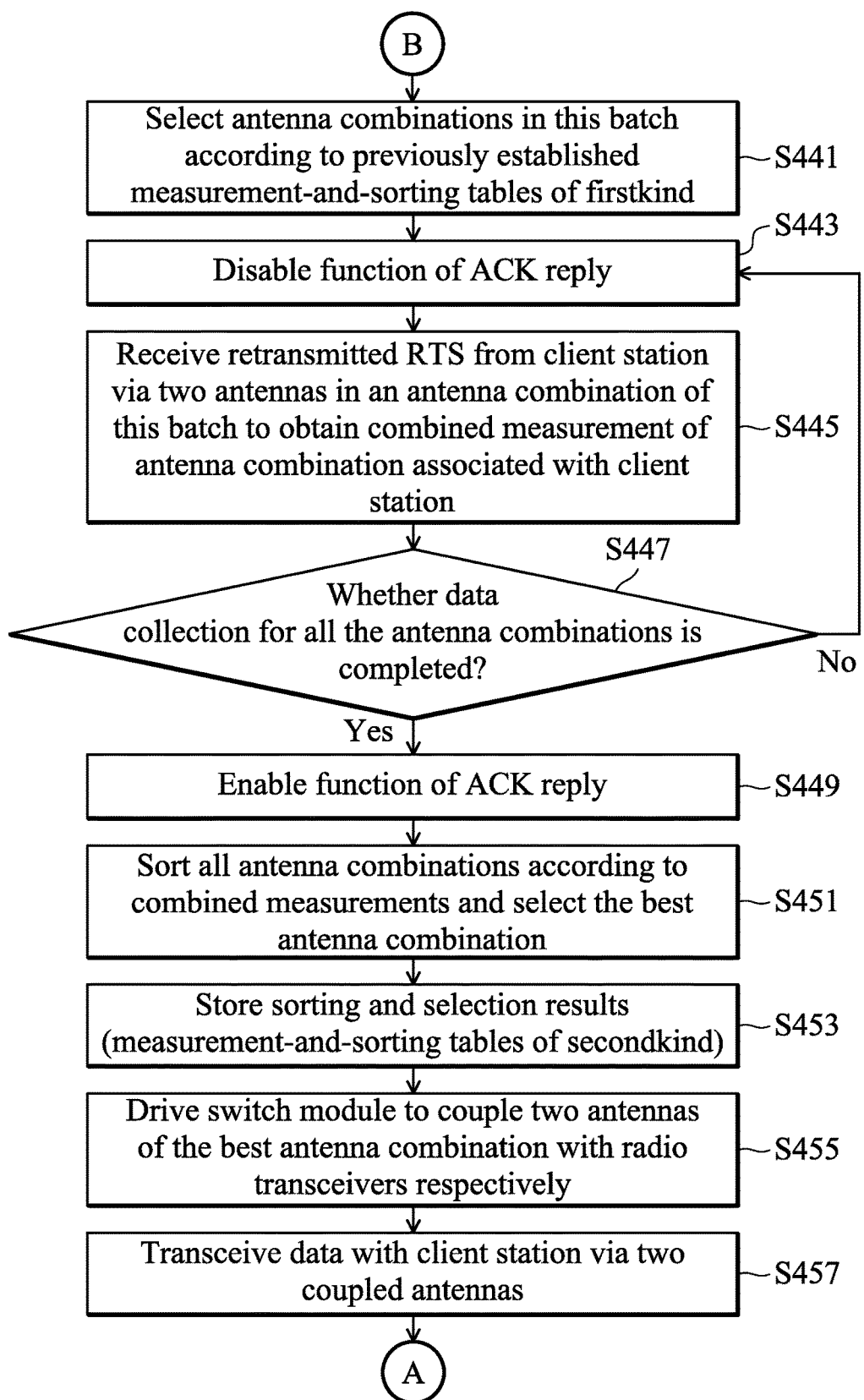

Therefore, it is desirable to have an efficient algorithm to select the best antenna combination for each electronic device, so as to improve the quality of transmitting/receiving radio signals or the data rate. FIGS. 4A, 4B and 4C illustrate flowcharts of a method for adaptive multi-antenna selection according to an embodiment of the invention. The method may be executed when the MAC and network processor 333 loads and executes program code or software. First, the maximum allowable retransmission number is configured for the client stations according to the technical specification (step S411). For example, the client stations may be allowed to retransmit a control frame less than seven times and a data frame less than four times. The maximum allowable retransmission number may be configured before the electronic device leaves the factory. Subsequently, the default antenna or antennas are used to establish a connection with a client station and perform an authentication therewith (step S413), and it is inspected whether a RTS, referring to block 210 of FIG. 2, has been received from the client station periodically (step S415). An example of step S413 is provided using an omnidirectional antenna (not shown in FIG. 3), or all or a preselected portion of the antennas 310a to 310f to establish a connection with the client station and perform an authentication therewith. Specifically, the WLAN AP 120 sends out beacons announcing one or more SSIDs (Service Set Identifiers), data rates, and other information periodically. In the association process, the electronic device 111, 113 or 115 sends out a probe request and scans all the channels and listens for beacons and responses to the probe requests from any access point. The electronic device 111, 113 or 115 associates to the access point that has the strongest signal. During association, the SSID, MAC address, and security settings are sent from the electronic apparatus 111, 113 or 115 to the WLAN AP 120 and checked by the WLAN AP 120. Authentication must occur before the electronic apparatus 111, 113 or 115 can pass traffic through the WLAN AP 120 to another node on the network. The electronic device 111, 113 or 115 completes the authentication with an authentication unit each other by exchanging a series of messages, such as an EAP-Request/SIM/Start(AT_VERSION_LIST), an EAP-Response/SIM/Start(AT_NONCE_MT,AT_SELECTED_VERSION, an EAP-Request/Challenge (AT_RAND,AT_MAC), an EAP-Response/Challenge (AT_MAC), etc. Those skilled in the art may use the standard protocol in the electronic device 111, 113 or 115 to perform the authentication, such as the EAP-TLS (Extensible Authentication Protocol for Transport Layer Security), the EAP-MDS, the EAP-TTLS (—Tunneled Transport Layer Security), the EAP-UMTS, the EAP-AKA (—UMTS Authentication and Key Agreement), etc. During the aforementioned scan, connection establishment and authentication, the exchanged messages are carried by management frames. It should be noted that the connection establishment and the authentication have completed when the WLAN AP 120 receives an RTS from the client station. When any client station completes the connection establishment and the authentication, the MAC and network processor 333 may record relevant information, such as the identifier of the client station, the connection time, etc., in the memory 335 for subsequent use, where the identifier of the client station may be a MAC address. If no RTS has been received (the "no" path of step S415), then the process continues to the unfinished connection establishment and authentication (step S417). If an RTS has been received (the "yes" path of step S415), then the process further determines whether the client station is the first time connected client station sending the RTS within a predetermined time interval (step S419). For example, the predetermined time interval may be set to two minutes. If so (the "yes" path of step S419), the process proceeds to step S421; otherwise (the "no" path of step S419), the process proceeds to step S441. In step S419, the MAC and network processor 333 may inspect the recorded connection time of the client station of the memory 335 to determine if the client station is the first time connected client station.

After determining that the client station is the first time connected client station within the predetermined time interval (the "yes" path of step S419), the process repeatedly collects signal measurements of the antennas 310a to 310f associated with the client station until all the data collection is completed or it reaches the maximum allowable retransmission number. Specifically, after determining the client station is the first time connected client station (the "yes" path of step S419), the process disables the function of ACK reply, that is, no ACK is replied to the client station, forcing the client station to retransmit the RTS after a time interval (step S421), and then receives the retransmitted RTS from the client station with two preselected antennas to obtain signal measurement of each antenna associated with the client station (step S423). When the data collection for all the antennas 310a to 310f is not completed and the maximum allowable retransmission number for the client station is not reached (the "no" path of step S425), the process continues to collect data for the next two antennas (steps S421 to S423). The maximum allowable retransmission number is determined in step S411. Signal measurements may be represented by RSSI (Radio Signal Strength Indicator) for suggesting signal strengths or by RSSI relative to noise floor for suggesting signal qualities. In step S423, the MAC and network processor 333 may store the signal measurements of the two antennas associated with the client station in the memory 335. The aforementioned cyclical data collection with reference made to the architecture of FIG. 3 may, for example, contain three runs: signal measurements of the antennas 310a and 310b associated with the client station are collected in the first run; that of the antennas 310c and 310d are collected in the second run; and that of the antennas 310e and 310f are collected in the third run. When the data collection for all the antennas 310a to 310f is completed or it reaches the maximum allowable retransmission number for the client station (the "yes" path of step S425), the process enables the function of ACK reply, enabling the client station to start data transmission after receiving an ACK (step S427). Subsequently, all antennas are sorted according to the obtained signal measurements and the two best antennas are selected (step S429), and the sorting and selection results are stored (step S431). The best two antennas may be the antennas with the strongest two RSSI or the best two RSSI relative to noise floor. In step S429, the MAC and network processor 333 may further determine whether the noise floor exceeds a threshold. If so, the measured signal qualities are used to sort and select antennas; otherwise, the measured signal strengths are used to do so. That is, when the noise floor exceeds the threshold, it is improper to use the measured signal strengths as the standard for sorting and selecting antennas, and the measured signal qualities are needed instead. Conversely, when the noise floor is lower than the threshold, the measured signal strengths can be directly applied as the standard for sorting and selecting antennas. The exemplary results may be referenced in Tables 2 and 3. Table 2 includes the sorting results of signal strengths when the noise floor is lower than the threshold. The exemplary Table 2 shows the best two antennas are the antennas 310c and 310b in sequence according to the obtained signal strengths, followed by the antennas 310d, 310a, 310e and 310f in a row.

TABLE 2

| Antenna No. | Rank | Signal Strength |
|---|---|---|
| 310a | 4 | RSSIa |
| 310b | 2 | RSSIb |
| 310c | 1 | RSSIc |
| 310d | 3 | RSSId |
| 310e | 5 | RSSIe |
| 310f | 6 | RSSIf |

Table 3 includes the sorting results of signal qualities when the noise floor is higher than the threshold. The exemplary Table 3 shows the best two antennas are the antennas 310c and 310b in sequence according to the obtained signal qualities, followed by the antennas 310d, 310a, 310e and 310f in a row.

TABLE 3

| Antenna ID. | Rank | Signal Quality |
|---|---|---|
| 310a | 4 | RSSIa - Noise floor a |
| 310b | 2 | RSSIb - Noise floor b |
| 310c | 1 | RSSIc - Noise floor c |
| 310d | 3 | RSSId - Noise floor d |
| 310e | 5 | RSSIe - Noise floor e |
| 310f | 6 | RSSIf - Noise floor f |

It should be noted that each measurement and sorting result illustrated in each row of Tables 2 and 3, also referred to as the measurement-and-sorting tables of the firstkind, is related to a single antenna. Subsequently, the switch module 320 is driven to couple the selected two antennas with the radio transceivers 331a and 331b respectively (step S433), and data is transmitted/received with the client station via the two coupled antennas (step S435). For example, in step S433, the MAC and network processor 333 drives the switch module 320 according to the sorting results of Table 2 or 3. Specifically, since the exemplary results of Table 2 or 3 show the best is the antenna 310c, the SPDT switch 321c and the SP6T switch 323a are controlled to couple the antenna 310c with the radio transceiver 331a. In addition, since the exemplary results of Table 2 or 3 show the second best is the antenna 310b, the SPDT switch 321b and the SP6T switch 323b are controlled to couple the antenna 310c with the radio transceiver 331b.

After determining that the client station is not the first time connected client station (the "no" path of step S419), several antenna combinations are selected in this batch according to the previously established measurement-and-sorting tables of the firstkind (referring to Table 2 or 3) (step S441), and the signal measurements of the selected antenna combinations are collected for the client station (steps S443 to S447). In step S441, the total number of the selected antenna combinations for each batch is less than the maximum allowable retransmission number (determined in step S411). Assuming that the maximum allowable retransmission number is seven, Table 4 shows the scores of the antenna combinations and each score belonging to which batch.

TABLE 4

| Antenna ID. (Rank A) | Antenna ID. (Rank B) | Score (A + B) | Batch Number |
|---|---|---|---|
| 310c (1) | 310a (4) | 5 | 1 |
| 310c (1) | 310b (2) | 3 | 1 |
| 310c (1) | 310d (3) | 4 | 1 |
| 310c (1) | 310e (5) | 6 | 1 |
| 310c (1) | 310f (6) | 7 | 2 |
| 310b (2) | 310a (4) | 6 | 1 |
| 310b (2) | 310d (3) | 5 | 1 |
| 310b (2) | 310e (5) | 7 | 2 |
| 310b (2) | 310f (6) | 8 | 2 |
| 310d (3) | 310a (4) | 7 | 2 |
| 310d (3) | 310e (5) | 8 | 2 |
| 310d (3) | 310f (6) | 9 | 2 |
| 310a (4) | 310e (5) | 9 | 3 |
| 310a (4) | 310f (6) | 10 | 3 |
| 310e (5) | 310f (6) | 11 | 3 |

The exemplary score is computed by adding the ranks of the two antennas for each antenna combination, and an antenna combination with a smaller score should be measured earlier than an antenna combination with a greater score. In an embodiment, according to the calculation results of Table 4, the measurement combinations in the first batch are the antennas (310c,310a), the antennas (310c,310b), the antennas (310c,310d), the antennas (310c,310e), the antennas (310b,310a) and the antennas (310b,310d) in a row, the measurement combinations in the second batch are the antennas (310c,310f), the antennas (310b,310e), the antennas (310b,310f), the antennas (310d,310a), the antennas (310d,310e) and the antennas (310d,310f) in a row, and the measurement combinations in the third batch are the antennas (310a,310e), the antennas (310a,310f) and the antennas (310e,310f) in a row. In another embodiment, only the antenna combinations in the first batch are measured to reduce the retransmission number of the RTS with the client station, such as the antennas (310c,310a), the antennas (310c,310b), the antennas (310c,310d), the antennas (310c, 310e), the antennas (310b,310a) and the antennas (310b, 310d) in a row. Subsequently, the function of ACK reply is disabled, that is, no ACK is replied to the client station, forcing the client station to retransmit the RTS after a time interval (step S443), and then the retransmitted RTS from the client station is received via two antennas in an antenna combination of this batch to obtain a combined measurement of the antenna combination associated with the client station (step S445). For example, according to Table 4, the first batch includes six antenna combinations, such as the antennas 310c and 310a, the antennas 310c and 310b, the antennas 310c and 310d, the antennas 310c and 310e, the antennas 310b and 310a, and the antennas 310b and 310d. The second batch includes six antenna combinations, such as the antennas 310c and 310f, the antennas 310b and 310e, the antennas 310b and 310f, the antennas 310d and 310a, the antennas 310d and 310e, and the antennas 310d and 310f. The third batch includes three antenna combinations, such as the antennas 310a and 310e, the antennas 310a and 310f, and the antennas 310e and 310f. When the data collection to all antenna combinations of this batch does not complete (the "no" path of step S447), the process proceeds to the data collection for the next antenna combination (steps S443 to S445). The maximum allowable retransmission number is determined in step S411. Combined measurements may be represented by diversity-combined RSSI for suggesting signal qualities or by any indicators indicating data rates. In step S443, the MAC and network processor 333 may store the combined measurement of the antenna combination associated with the client station in the memory 335. The aforementioned cyclical data collection at most contains six runs. When the data collection to all antenna combinations of this batch is completed (the "yes" path of step S447), the process enables the function of ACK reply, enabling the client station to start data transmission after receiving an ACK (step S449). Subsequently, all antenna combinations are sorted according to the combined measurements and the best antenna combination is selected (step S451), and the sorting and selection results are stored (step S453). The exemplary results may refer to the following Tables 5 and 6. Table 5 includes the sorting results of signal qualities.

TABLE 5

| Antenna Combination | Rank | Signal Qualities |
|---|---|---|
| 310c, 310a | 3 | RSSIca |
| 310c, 310b | 1 | RSSIcb |
| 310c, 310d | 2 | RSSIcd |

TABLE 5-continued

| Antenna Combination | Rank | Signal Qualities |
|---|---|---|
| 310c, 310e | 6 | RSSIce |
| 310b, 310a | 5 | RSSIba |
| 310b, 310d | 4 | RSSIbd |

Table 5 shows the best antenna combination includes antennas 310c and 310b according to the diversity-combined RSSI. Table 6 includes the sorting results of data rates.

TABLE 6

| Antenna Combination | Rank | Signal Qualities |
|---|---|---|
| 310c, 310a | 3 | DATca |
| 310c, 310b | 1 | DATcb |
| 310c, 310d | 2 | DATcd |
| 310c, 310e | 6 | DATce |
| 310b, 310a | 5 | DATba |
| 310b, 310d | 4 | DATbd |

Table 6 shows that the best antenna combination includes antennas 310c and 310b according to the indicators representing the data rates. It should be noted that each measurement and sorting result illustrated in each row of Tables 5 and 6, also referred to as the measurement-and-sorting tables of the secondkind, is related to overall performance for an antenna combination. Subsequently, the switch module 320 is driven to couple the two antennas with the best antenna combination to the radio transceivers 331a and 331b respectively (step S455), and data is transmitted/received with the client station via the two coupled antennas (step S457).

Although the process flow is shown in the embodiments based on the hardware architecture having two radio transceivers with six directional antennas, it is understood that alternative embodiments are contemplated, such as modifying certain steps to adapt to another hardware architecture having more or fewer radio transceivers and directional antennas without departing from the spirit of the invention. For example, the hardware architecture is equipped three radio transceivers and eight directional antennas.

Since the aforementioned embodiments describe disabling the function of ACK reply responding to the received RTS to achieve the purpose of the data collection for more antennas, those skilled in the art can also modify the embodiments to disable the function of poll response responding to the received poll request to achieve the same purpose. The RTS and the poll request made by the client station, which request time intervals for data transmission or receiving to the WLAN AP. The ACK and the poll response made by the WLAN AP are replies responding to the RTS and the poll request respectively.

The antenna selection procedure recited in steps S421 to S431 in FIG. 4B (the procedure is considered a coarse selection) selects an antenna combination for communicating with a particular client station according to the performance of each single antenna, such as RSSI for suggesting signal strengths, RSSI relative to noise floor for suggesting signal qualities, etc. The antenna selection procedure recited in steps S443 to S453 in FIG. 4C (the procedure is considered a fine selection) selects an antenna combination for communicating with a particular client station according to the overall performance of each antenna combination, such as diversity-combined RSSI for suggesting signal qualities or any indicators indicating data rates, etc. The antenna selection procedure recited in steps S443 to S453 may use the outcomes produced in step S431 to determine antenna combinations to be measured in at least one batch.

Although the embodiment has been described as having specific elements in FIG. 3, it should be noted that additional elements may be included to achieve better performance without departing from the spirit of the invention. While the process flow described in FIGS. 4A, 4B and 4C include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for adaptive multi-antenna selection, executed by an AP (access point), comprising:
   after receiving a data transmission request or a data receipt request from a client station, determining whether the client station is a first time connected client station within a predetermined time interval;
   if the client station is the first time connected client station, selecting a first antenna combination to transmit/receive data with the client station using a first antenna selection procedure; and
   if the client station is not the first time connected client station, selecting a second antenna combination to transmit/receive data with the client station using a second antenna selection procedure,
   wherein the first antenna selection procedure selects the first antenna combination according to single antenna performance, and the second antenna selection procedure selects the second antenna combination according to overall antenna combination performance.

2. The method of claim 1, further comprising:
   selecting a plurality of antenna combinations to be measured using an outcome produced by the first antenna selection procedure.

3. The method of claim 2, wherein the first antenna selection procedure further comprises:
   disabling a function for responding to the data transmission request or the data receipt request, forcing the client station to retransmit the data transmission request or the data receipt request; and
   receiving the retransmitted data transmission request or data receipt request using a preselected antenna combination to generate a first receipt outcome;
   obtaining performance of each single antenna according to the first receipt outcome and accordingly selecting the first antenna combination; and
   after selecting the first antenna combination, enabling the function for responding to the data transmission request or the data receipt request.

4. The method of claim 2, wherein the second antenna selection procedure further comprises:
   disabling a function for responding to the data transmission request or the data receipt request, forcing the client station to retransmit the data transmission request or the data receipt request;

receiving the retransmitted data transmission request or the data receipt request using one of the antenna combinations to be measured to generate a second receipt outcome;

obtaining overall performance of each antenna combination according to the second receipt outcome to select the second antenna combination; and after selecting the second antenna combination, enabling the function for responding to the data transmission request or the data receipt request.

5. The method of claim 1, wherein the single antenna performance is represented by an RSSI (Radio Signal Strength Indicator).

6. The method of claim 1, wherein the overall antenna combination performance is represented by a diversity-combined RSSI (Radio Signal Strength Indicator) or an indicator indicating a data rate.

7. The method of claim 1, further comprising:

after completing the first antenna selection procedure, driving a programmable logic device to control a switch module to couple a plurality of radio transceivers with antennas of the first antenna combination respectively; and after completing the second antenna selection procedure, driving the programmable logic device to control the switch module to couple the radio transceivers with antennas of the second antenna combination respectively.

8. The method of claim 7, wherein a total number of the radio transceivers is less than a total number of antennas equipped in the AP, and the antennas are directional antennas.

9. A method for adaptive multi-antenna selection, executed by an AP (access point), comprising:

after receiving a first data transmission request or a first data receipt request from a client station and determining that the client station is a first time connected client station within a predetermined time interval, disabling a function for responding to the first data transmission request or the first data receipt request, forcing the client station to retransmit the first data transmission request or the first data receipt request;

receiving the retransmitted first data transmission request or first data receipt request using a predetermined antenna combination in order to generate a first receipt outcome;

obtaining performance of each single antenna according to the first receipt outcome, so as to select a first antenna combination;

storing the performance of each single antenna in a memory; and after selecting the first antenna combination, enabling the function for responding to the first data transmission request or the first data receipt request.

10. The method of claim 9, wherein a total number for retransmitting the first data transmission request or the first data receipt request is less than an allowable retransmission number.

11. The method of claim 9, wherein the first data transmission request or the first data receipt request is an RTS (Request To Send) or a poll request.

12. The method of claim 9, wherein no message corresponding to the first data transmission request or the first data receipt request is replied when the function for responding to the first data transmission request or the first data receipt request is disabled, and a message corresponding to the first data transmission request or the first data receipt request is replied when the function for responding to the first data transmission request or the first data receipt request is enabled.

13. The method of claim 12, wherein the replied message is an ACK (acknowledgement) or a polling response.

14. The method of claim 9, further comprising:

after receiving a second data transmission request or a second data receipt request from the client station and determining that the client station is not the first time connected client station within the predetermined time interval, reading the performance information of each single antenna from the memory;

selecting a plurality of antenna combinations to be measured in a batch according to the performance information of each single antenna;

disabling the function for responding to the second data transmission request or the second data receipt request, forcing the client station to retransmit the second data transmission request or the second data receipt request;

receiving the retransmitted second data transmission request or second data receipt request using one of the antenna combinations to generate a second receipt outcome;

obtaining overall performance of the used antenna combination according to the second receipt outcome to select a second antenna combination; and after selecting the second antenna combination, enabling the function for responding to the second data transmission request or the second data receipt request.

15. A method for adaptive multi-antenna selection, executed by an AP (access point), comprising:

after receiving a data transmission request or a data receipt request from a client station and determining that the client station is not a first time connected client station within a predetermined time interval, reading performance information of each single antenna associated with the client station from a memory;

selecting a plurality of antenna combinations to be measured within a batch according to the performance information of each single antenna;

disabling a function for responding to the data transmission request or the data receipt request, forcing the client station to retransmit the data transmission request or the data receipt request;

receiving the retransmitted data transmission request or data receipt request using one of the antenna combinations to generate a receipt outcome;

obtaining overall performance of each antenna combination according to the receipt outcome, so as to select a best antenna combination; and after selecting the best antenna combination, enabling the function for responding to the data transmission request or the data receipt request.

16. The method of claim 15, wherein a total number of the antenna combinations to be measured is less than an allowable retransmission number.

17. The method of claim 15, wherein none of messages is replied for the data transmission request or the data receipt request when the function for responding to the data transmission request or the data receipt request is disabled, a message corresponding to the first data transmission request or the first data receipt request is replied when the function for responding to the data transmission request or the data receipt request is enabled.

18. The method of claim 15, further comprising:
driving a programmable logic device to control a switch module to couple a plurality of radio transceivers with antennas of the best antenna combination respectively.

19. The method of claim 18, wherein a total number of radio transceivers is less than a total number of antennas equipped in the AP, and the antennas are directional antennas.

20. The method of claim 15, wherein the overall performance of each antenna combination is represented by a diversity-combined RSSI (Radio Signal Strength Indicator) or an indicator indicating a data rate.

* * * * *